(12) United States Patent
Brothers

(10) Patent No.: US 6,438,125 B1
(45) Date of Patent: Aug. 20, 2002

(54) METHOD AND SYSTEM FOR REDIRECTING WEB PAGE REQUESTS ON A TCP/IP NETWORK

(75) Inventor: John D. W. Brothers, Alpharetta, GA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/236,159

(22) Filed: Jan. 22, 1999

(51) Int. Cl.[7] .................. H04L 12/26; H04L 12/66; G06F 17/00
(52) U.S. Cl. .................. 370/352; 370/401; 707/10; 707/501; 709/203; 709/219; 709/238
(58) Field of Search .................. 370/338, 349, 370/352, 389, 401; 707/3, 10, 100, 500, 501, 513; 709/201, 202, 203, 217, 218, 219, 225, 226, 229, 238, 249

(56) References Cited

U.S. PATENT DOCUMENTS

| | | | | |
|---|---|---|---|---|
| 5,941,954 A | * | 8/1999 | Kalajan | 709/239 |
| 6,038,598 A | * | 3/2000 | Danneels | 709/219 |
| 6,112,212 A | * | 8/2000 | Heitler | 707/501 |
| 6,240,461 B1 | * | 5/2001 | Cieslak et al. | 709/235 |

* cited by examiner

Primary Examiner—Alpus H. Hsu
(74) Attorney, Agent, or Firm—Withrow & Terranova, P.L.L.C.

(57) ABSTRACT

A method and system for redirecting web page requests on a TCP/IP network is described. The method may be performed by a web traffic monitor that intercepts at least a portion of web-based traffic from a client/subscriber on a network. Based on a predetermined criterion, the web traffic monitor either responds to the client/subscriber with an action other than that which was intended by the user or relays the traffic to the destination originally intended by the user. The predetermined criterion may be chosen from, among others, a time period that has elapsed since the last web page request issued from the client/subscriber, a particular IP destination address requested by the client/subscriber, or the client/subscriber's IP address. Once the predetermined criterion is met, the traffic monitor acts appropriately by, for example, substituting a replacement web page for the web page requested by the client/subscriber. Appropriate methods of returning the replacement web page to the client/subscriber include, but are not limited to, returning the replacement web page: (1) without ever returning the intended web page; (2) for only a predetermined period of time; or (3) in a secondary browser window that pops on top of the intended web page, which is returned in a primary browser window.

31 Claims, 3 Drawing Sheets

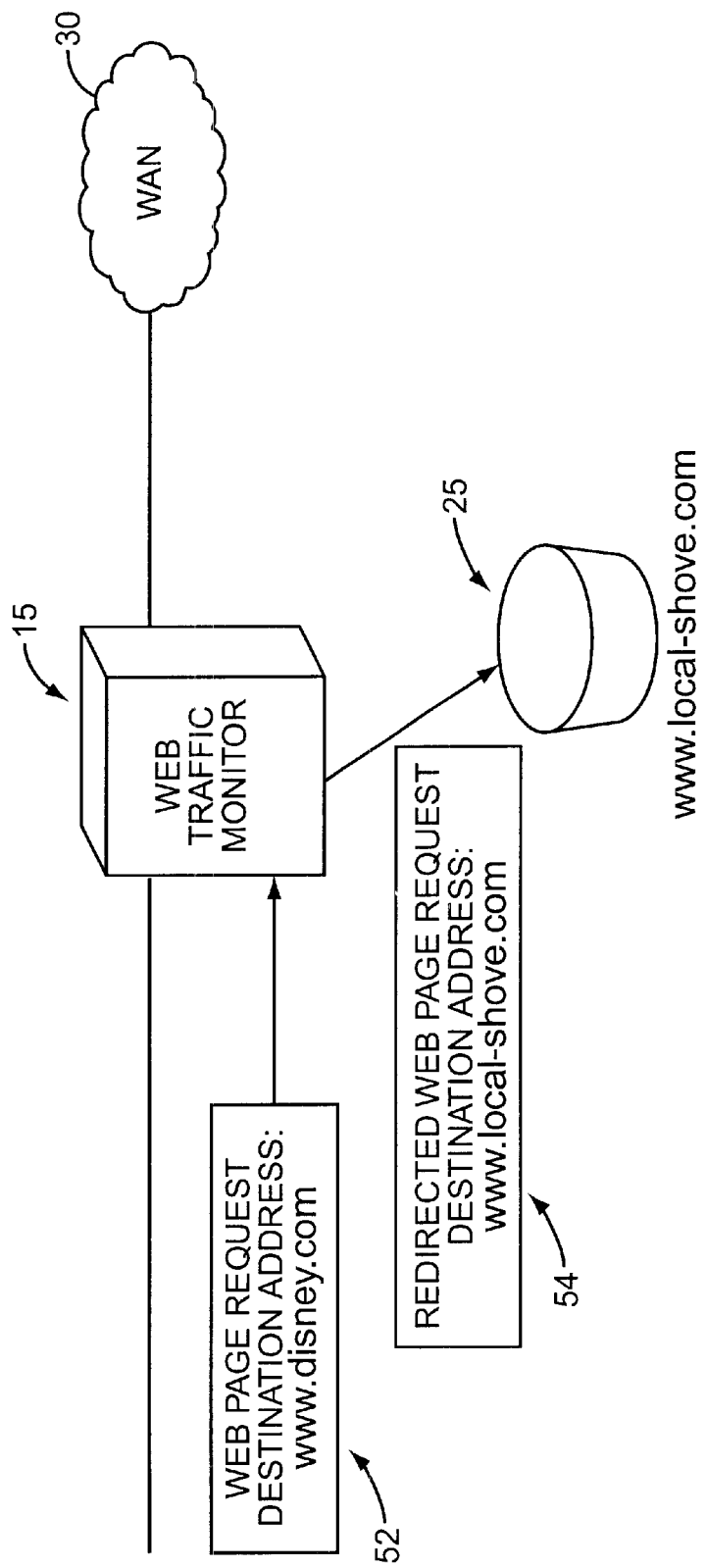

METHOD AND SYSTEM FOR REDIRECTING WEB PAGE REQUESTS ON A TCP/IP NETWORK

I. BACKGROUND OF THE INVENTION

A. Field of the Invention

The present invention relates to a method and a system connected to a computer network for redirecting network traffic. More specifically, the present invention is a method and system for monitoring web-based traffic and redirecting, either temporarily or permanently, that traffic based on predetermined criteria.

B. Description of the Prior Art

A client/subscriber on a LAN or WAN, a node on the network, obtains information from other nodes on the LAN or a WAN by connecting to those other nodes. Once connected, the client/subscriber can view information residing on that node. Currently, a device can be connected to the network that monitors the content of the requests for information initiated from each node. For example, a network device can be placed between a set of nodes on a LAN and a WAN connection, so that the requests from the various nodes on the LAN to connect to the WAN can be monitored for content. One use of such a device (sometimes called a web cache server) is to perform web page caching, which is popular with a variety of large internet service providers.

FIG. 1 is a schematic illustration of such a web cache server 20 configured in a network with a traffic monitor 10. The traffic from various subscribers connected to a WAN (e.g., via a dialup 40, DSL 42 or Cable Modem 44 connection) is aggregated at a central point 50 (e.g., a hub), where a dedicated server 10 monitors the traffic as it on to the WAN 30. The monitor 10 ignores non-web traffic, and passes it through the router 60 on to the WAN 30. When the monitor 10 detects a request for a cached web page, the request is sent to the web page cache server 20, which "pretends" to be the final destination. It returns the appropriate web page to the client/subscriber through the local network.

The primary benefit of web page caching is reduced congestion on the WAN 30. By maintaining local content on the web page cache server 20, the overall performance for all users is improved. The Internet service provider @ Home uses web page caching extensively, to improve the quality of service it provides. to its end users without requiring large investments in Internet bandwidth.

However, network managers, Internet service providers, and content providers currently have no way of temporarily redirecting requests for access to a particular web page to a different (replacement) web page. Such a capability would enable the effective delivery of valuable information to the users using the full flexibility of the web page medium. For example, the network manager, internet service provider, or content provider could insert an advertisement or other valuable information to Internet users without being restricted to a relatively small portion of the web page that is requested by the user. This capability is particularly important to advertisers on the web because it would enable them to use all the flexibility of the medium and thus deliver a more attractive, interesting, and thus more effective advertisement.

Revenue generated by advertising on the Internet is growing explosively. According to the Internet Advertising Bureau, advertising spending during the first quarter of 1998 totaled $351.3 million, a 271% increase over the first quarter of 1997. Currently, advertisers are limited to a relatively small portion of a web page containing information of interest to the advertiser's target market. The advertiser's portion of the page typically consists of a bare, blue-text hyperlink to the advertiser's website or a relatively small banner (consisting of a still image or a relatively short, sequential series of still images) overlaying a hyperlink. Viewers of the web pages can easily overlook or disregard these simplistic advertisements. The advertisements also are inherently boring because they cannot use the flexibility of the web medium; no movies and no sound. Moreover, the advertisement is relatively difficult to change because the banner or link is embedded within a third party's web page, the content of which may not be controlled by the advertiser.

II. SUMMARY OF THE INVENTION

The method according to the invention for redirecting web page requests on a TCP/IP network may be performed by a web traffic monitor that intercepts at least a portion of web-based traffic from a client/subscriber on a network. Based on a predetermined criterion, the web traffic monitor either responds to the client/subscriber with an action other than that which was intended by the user or relays the traffic to the destination originally intended by the user. The predetermined criterion may be chosen from, among others, a time period that has elapsed since the last web page request issued from the client/subscriber, a particular IP destination address requested by the client/subscriber, or the client/subscriber's IP address. Once the predetermined criterion is met, the traffic monitor acts appropriately by, for example, substituting a replacement web page for the web page requested by the client/subscriber, sending a series of replacement pages, failing to provide any page (e.g., as a security device), sending the replacement page after a predetermined delay period, or sending the intended web page. Appropriate methods of returning the replacement web page to the client/subscriber include, but are not limited to, returning the replacement web page: (1) without ever returning the intended web page; (2) without ever returning the intended web page while enforcing the replacement web page such that all actions taken by the client/subscriber using the browser cause the replacement web page to persist, (3) for only a predetermined period of time before delivering the intended web page; or (4) in a secondary browser window that pops on top of the intended web page, which is returned in a primary browser window.

A system for performing the method of the invention includes (1) a web traffic monitor capable of intercepting and appropriately routing or spoofing web-based traffic originating from and intended for the client/subscriber and (2) a web content shove server from which the web traffic monitor can retrieve replacement web pages for transmission to the client/subscriber. The web traffic monitor need not intercept all network traffic originating from or intended for the client/subscriber, but only at least some web traffic. The web traffic monitor can be a physical device interposed in the communication path between the client/subscriber and web page content server (e.g., on a WAN) or a software process running on an existing device on this communication path like a router or an ISP gateway. The web content shove server can be a physical device connected to the web traffic monitor or a software process running on the web traffic monitor or on another node accessible to the web traffic monitor.

The system according to the invention, as embodied and broadly described below, is a web traffic monitor interposed into a communication path between a client/subscriber and a web page content server which is operable to: intercept at least some web traffic originating from the client/subscriber and determine whether the intercepted web traffic includes a request originating from the client/subscriber for an intended web page and if the traffic includes the request for the intended web page, then determine, based on a predetermined criterion, whether it is appropriate to respond to the request for the intended web page by returning a replacement web page; and if the predetermined criterion is satisfied, then retrieve the replacement web page from a web content shove server linked to the web traffic monitor and return the replacement web page to the client/subscriber; or if the predetermined criterion is not satisfied, then transmit the request for the intended web page on the communication path to the web page content server; or if the traffic does not include the request for the intended web page, transmit the traffic to an appropriate location.

The preceding general description of the invention and the following detailed description are exemplary and explanatory only and do not restrict the claims directed to the invention. The accompanying drawings, which are part of this specification, illustrate one embodiment of the invention and together with the description, serve to explain the principles of the invention.

III. BRIEF DESCRIPTION OF THE DRAWINGS

FIG. 3 is a schematic illustration of the manner in which a web traffic monitor according to the present invention redirects a request for an intended web page to a web content shove server according to the present invention.

IV. DESCRIPTION OF THE PREFERRED EMBODIMENT(S)

Figure 1:
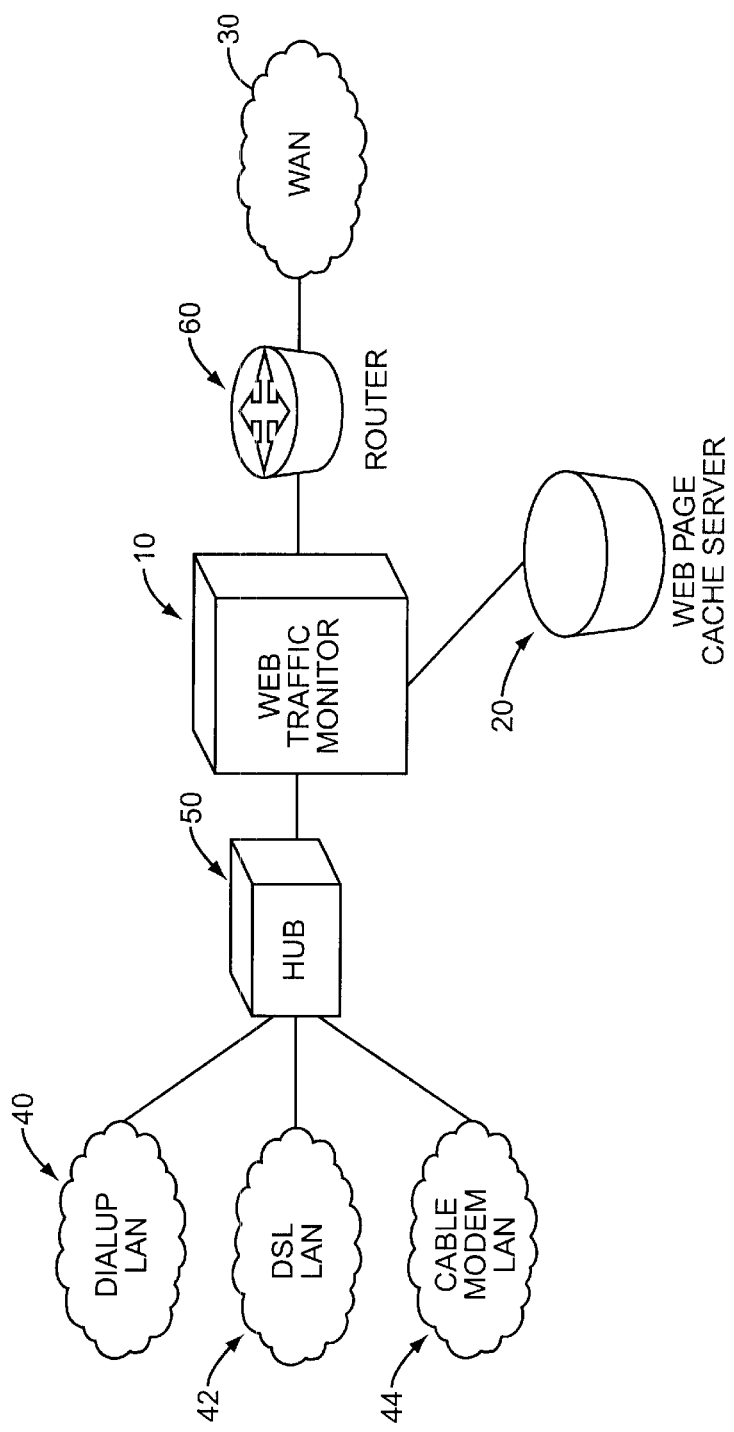
FIG. 1 is a schematic illustration of a conventional network configuration incorporating a web page cache server and a web traffic monitor.

The following is a detailed description of a preferred embodiment of a web traffic monitor 15 and web content shove server 25 and their use according to the present invention. The web traffic monitor 15 and web content shove server 25 described below and shown in the drawings are merely examples of a web traffic monitor and a web content shove server according to the claims. Wherever possible, the same reference numbers will be used throughout the drawings to refer to the same or similar parts.

Figure 2:
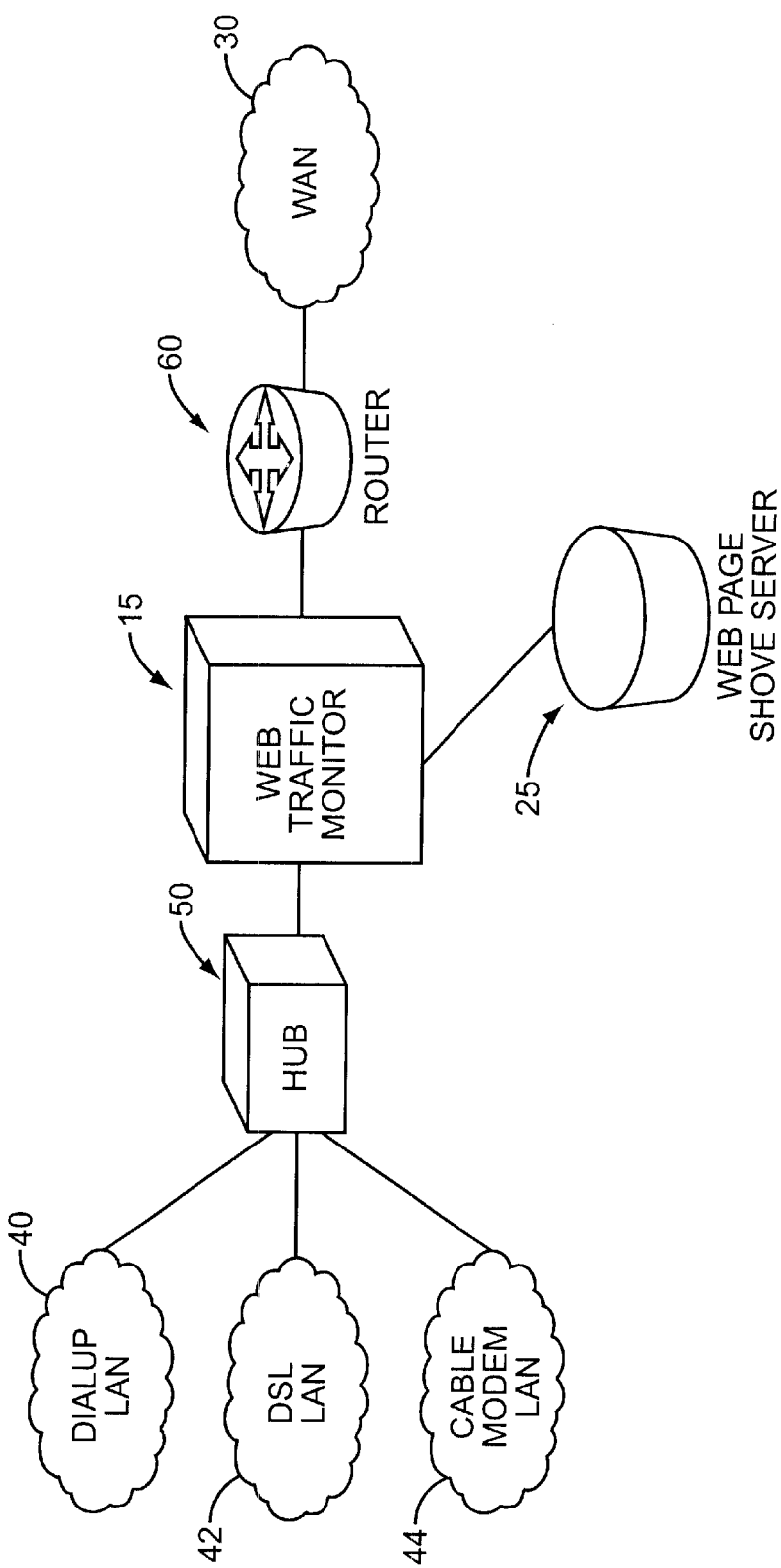
FIG. 2 is a schematic illustration of one embodiment of a network configuration incorporating a web traffic monitor and web page shove server according to the present invention.

FIG. 2 is a schematic illustration of an embodiment of a network incorporating a web traffic monitor 15 and a web content shove server 25 according to the present invention. Neither the hub 50 nor the router 60 is a necessary component of the network, but they are shown in a typical network configuration. The LAN may, for example, be a dial-up LAN 40, a DSL LAN 42, a cable-modem LAN 44 or any other type of LAN that is connected via a hub 50 or similar device to a WAN 30. A web traffic monitor 15 (essentially a server or software process on a router or gateway that is dedicated for monitoring the content of traffic between the LAN and WAN 30) is interposed between the hub 50 and router 60 to the WAN 30 so that some or all web traffic between the LAN and WAN 30 passes through the web traffic monitor 15. The web traffic monitor 15 may be located at any point in the network at which it may monitor at least some web traffic between at least one client/subscriber and a web page content shove server 25 (which may alternatively be a node on the WAN 30). The web traffic monitor 15 checks web traffic to determine whether the web traffic contains a request to connect to the Internet and retrieve a web page.

In general, web page requests consist of a stream of data packets to and from the source and destination. This stream of packets is the traffic that establishes, conducts, and tears down a virtual connection between the two devices. The identification of web page requests is accomplished as follows. The client/subscriber's machine generates an IP data packet, with certain pieces of protocol information embedded within it. The two elements of interest to the web traffic monitor 15 are the destination port, and the transport layer (Layer 4) protocol. Both of these elements are easily retrieved from the IP data packet headers. A combination of a and a destination port of 80 or 8080 typically indicates that the client/subscriber is attempting to access a web page. Of course, other destination ports may be recognized as web traffic or other types of traffic to which a replacement web page might be an appropriate response. After determining that the client/subscriber has issued a web page request, the web traffic monitor 15 may check a data set to determine, based on a predetermined criterion, whether the request 52 for the intended web page should be granted.

For example, if the client/subscriber has recently received a replacement web page, the request 52 for the intended web page is granted, the intended web page is retrieved and displayed. However, if more than a predetermined period of time has passed since the client/subscriber has received a replacement page, the web traffic monitor 15 redirects the request 52 for the intended web page to the web content shove server 25, which initiates the return of the replacement web page. Such a time-based criterion would ensure that the client/subscriber is redirected to a replacement web page (e.g., an advertisement) only periodically. And this predetermined time period between sending replacement web pages may be changed to tailor the frequency with which replacement web pages appear to any particular subscriber. Other criteria that could be used to determine whether to redirect the client/subscriber's request 52 for the intended web page include, but are not limited to: a set of particular IP destination or source addresses in the data packets constituting the client/subscriber's request 52 for the intended web page; time of day; type of browser used by the subscriber; the speed or type of the subscriber's network connection; the subscriber's identity, geographical location, age, income, gender, type of network access, or other demographic information; the level of traffic on the network; or the virtual LAN to which the client/subscriber is connected. Additionally, the content of the replacement web page may be altered based on any of these criteria.

If the specified criterion is met, the web traffic monitor 15 issues a redirected request 54 to the web content shove server 25, as shown in FIG. 3. To do this, the web traffic monitor 15 changes the destination IP address in each data packet constituting the client/subscriber's request, from the original location, to the web content shove server 25. The web traffic monitor 15 changes the intended destination address in every data packet that is part of the request 52 for the intended web page to a redirected destination address (retrieved from memory) and stores in memory the intended destination address. The web traffic monitor issues the redirected request 54 to the web content shove server 25, which responds to the web traffic monitor 15 with the replacement web page. The web traffic monitor 15 then performs the "reverse" activity for data packets sent from the web content shove server 25 to be relayed to the client/subscriber. The source address (i.e., the web content shove server 25's address) is replaced (after being retrieved from a memory in the web traffic monitor 15) with the original source address (i.e., the address of the intended web page) and the destination address is set to the client/subscriber's address so that the client/subscriber can properly handle the connection. Thus, the client/subscriber receives the replacement web page, but the data packets contain information to lead the client/subscriber to "believe" it has received the intended web page. Additionally, web traffic monitor 15 may return a series of replacement web pages rather than a single replacement web page.

The replacement web page can be supplied to the client/subscriber in a number of different ways, including, but not limited to the following ways. First, the replacement page can be supplied without ever providing access to the intended web page. A variation of this approach would be to "enforce" the replacement web page such that the subscriber, using the browser, cannot remove the replacement web page. The enforcement of the replacement web page could be time limited or not. These approaches might be useful if the replacement web page is used as a security mechanism.

Second, the "refresh" feature of web browsers can be used to display the replacement page for a fixed duration. The replacement web page could contain a "refresh" command that includes instructions to wait for a specified time and then reissue the request for the intended web page. The web traffic monitor 15 would be configured to pass this second request for the intended web page on to the WAN 30. For example, a quick second request would not satisfy the time-based criterion discussed above, and thus the request would be passed through to the WAN 30.

Third, the replacement page could be displayed in a secondary window, a technology that also exists in current browsers. This secondary window would "pop-up" in front of the original browser window, partially or fully obscuring it. Typically, this secondary window (also known as an interstitial window) must be minimized or closed before the user could view the intended web page without obstruction. Multiple replacement pages could be displayed in multiple secondary windows. The use of secondary windows allows the user, if interested in the replacement web page, to examine the replacement page at will, and potentially use the secondary window to browse further on the subject displayed in the window. If uninterested, the user can close the secondary window, and return to the original window browser and the intended web page.

It is also possible to use active languages, such as Java, JavaScript or ActiveX to provide a faster and/or smaller secondary window. The use of such an active language would increase the flexibility of the presentation of information in the secondary window.

It will be apparent to those skilled in the art that various modifications and variations can be made to the method and system described above for redirecting web page requests on a TCP/IP network according to the invention without departing from the scope or spirit of the invention. These other embodiments of the invention will be apparent to those skilled in the art from their consideration of the specification and practice of the invention as described in this document. The applicant intends that the specification and examples be considered as exemplary only, with a true scope and spirit of the invention being indicated by the following claims.

What is claimed is:

1. A web traffic monitor interposed into a communication path between one of a client or a subscriber and a web page content server which is operable to:

A. intercept at least some web traffic originating from the one of the client or the subscriber; and B. determine whether the intercepted web traffic includes a request originating from the one of the client or the subscriber for an intended web page which may be retrieved from the web page content server and:

i. if the traffic does include the request for the intended web page, then determine, based on a predetermined criterion, whether it is appropriate to respond to the request for the intended web page by returning a replacement page other than that originally intended by the one of the client or the subscriber; and a. if the predetermined criterion is satisfied, then retrieve the replacement web page from a web content shove server linked to the web traffic monitor and return the replacement web page to the one of the client or the subscriber; or b. if the predetermined criterion is not satisfied, then transit the request for the intended web page on the communication path to the web page content server; or ii. if the traffic does not include the request for the intended web page, transmit the traffic to an appropriate location.

2. The web traffic monitor of claim 1, in which the predetermined criterion is a particular length of time that has elapsed since an immediately preceding request from the one of the client or the subscriber for any web page.

3. The web traffic monitor of claim 1, in which the predetermined criterion is that the request is directed to at least one of a particular set of IP destination addresses.

4. The web traffic monitor of claim 1, in which the predetermined criterion is that the request originates from at least one of a particular set of IP source addresses.

5. The web traffic monitor of claim 1, in which the replacement web page is returned to the one of the client or the subscriber and the intended web page is never returned to the one of the client or the subscriber.

6. The web traffic monitor of claim 1, in which the traffic monitor is further operable to return the intended web page to the one of the client or the subscriber after a predetermined viewing time period has elapsed since the replacement web page was returned to the one of the client or the subscriber.

7. The web traffic monitor of claim 1, in which the traffic monitor is further operable to:

A. return the intended web page to the one of the client or the subscriber in a primary window; and B. return the replacement web page to the one of the client or the subscriber in a secondary window.

8. A web traffic monitor interposed into a communication path between one of a client or a subscriber and a web page content server which is operable to:

A. intercept at least some web traffic originating from the one of the client or the subscriber; and B. determine whether the intercepted web traffic includes a request or originating the from one of the client or the subscriber for an intended web page which may be retrieved from the web page content server and:

i. if the traffic does include the request for the intended web page, then determine, based on a predetermined criterion, whether it is appropriate to respond to the request for the intended web page by returning a replacement page; and a. if the predetermined criterion is satisfied, then retrieve the replacement web page from a web content shove server linked to the web traffic monitor and return the replacement web page to the one of the client or the subscriber, or
   b. if the predetermined criterion is not satisfied, then transmit the request for the intended web page on the communication path to the web page content server; or
   ii. if the traffic does not include the request for the intended web page, transmit the traffic to an appropriate location, in which
C. the request for the intended web page includes one of a client or a subscriber data packet, comprising:
   i. an original one of a client or a subscriber destination address referring to the intended web page and
   ii. one of a client or a subscriber source address referring to the one of the client or the subscriber;
D. the return of the replacement web page is accompanied via return traffic originating from the web content shove server including a shover data packet, comprising:
   i. a shover destination address referring to the one of the client or the subscriber and
   ii. a shover source address referring to the intended web page; and
E. the web traffic monitor is further operable to:
   i. before retrieving the replacement web page:
      a. store the original one of the client or the subscriber destination address in a storage location,
      b. overwrite the original client/subscriber destination address in the one of the client or the subscriber data packet with a redirected destination address referring to the replacement web page,
   ii. after receiving the return traffic from the web content shove server:
      a. retrieve the original one of the client or the subscriber destination address from the storage location, and
      b. overwrite the shover source address in the shover data packet with the original one of the client or the subscriber destination address.

9. The web traffic monitor of claim 8, in which the communications path is a channel linking one of a client or a subscriber network, of which the one of the client or the subscriber is a node, to a WAN, of which the web page content server is a node.

10. The web traffic monitor of claim 9, in which the web content shove server is a node accessible to both the one of the client or the subscriber and the web traffic monitor.

11. The web traffic monitor of claim 9, in which the web content shove server is a software-based process running on the web traffic monitor.

12. A method for redirecting web traffic, comprising the steps of:
A. intercepting at least some of the web traffic on a communication path between one of a client or a subscriber and a web page content server and
B. determining whether the intercepted web traffic includes a request originating from the one of the client or the subscriber for an intended web page which may be retrieved from the web page content server and:
   i. if the traffic does include the request for the intended web page, then determining whether a predetermined criterion is met, and
      a. if the predetermined criterion is met,
         1) requesting a replacement web page other than that which was intended by the one of the client or the subscriber from a web content shove server and
         2) returning the replacement web page to one of the client or the subscriber; or
      b. if the predetermined criterion is not met, the transmitting the request for the intended web page on the communication path to the web page content server, or
   ii. if the traffic does not include the request for the intended web page, transmitting the traffic to an appropriate location.

13. The method of claim 12, in which the predetermined criterion is a particular length of time that has elapsed since an immediately preceding request from the one of the client or the subscriber for any web page.

14. The method of claim 12, in which the predetermined criterion is that the request is directed to at least one of a particular set of IP destination addresses.

15. The method of claim 12, in which the predetermined criterion is that the request originates from at least one of a particular set of IP source addresses.

16. The method of claim 12, further comprising the step of returning the intended web page to the one of the client or the subscriber after a predetermined viewing time period has elapsed after performing the step of returning the replacement web page to the one of the client or the subscriber.

17. The method of claim 12, in which the step of returning the replacement web page to the one of the client or the subscriber is performed by retaining the replacement web page in a secondary window and further comprising the step of returning the intended web page to the one of the client or the subscriber in a primary a window.

18. A method for redirecting web traffic, comprising the steps of:
A. intercepting at least some of the web traffic on a communication path between one of a client or a subscriber and a web page content server and
B. determining whether the intercepted web traffic includes a request originating from the one of the client or the subscriber for an intended web page which may be retrieved from the web page content server and:
   i. if the traffic does include the request for the intended web page, then determining whether a predetermined criterion is met, and
      a. if the predetermined criterion is met,
         1) requesting a replacement web page from a web content shove server and
         2) returning the replacement web page to the one of the client or the subscriber, or
      b. if the predetermined criterion is not met, then transmitting the request for the intended web page on the communication path to the web page content server, or
   ii. if the traffic does not include the request for the intended web page, transmitting the traffic to an appropriate location in which:
C. the step of requesting the intended web page includes transmission of one of a client or a subscriber datapacket, comprising:
   i. an original one of a client or a subscriber destination address referring to the intended web page and
   ii. one of a client or a subscriber source address referring to the one of the client or the subscriber;
D. the step of requesting the replacement web page is accomplished via return traffic originating from the web content shove server including a shover data packet, comprising:

i. a shover destination address referring to the one of the client or the subscriber and
ii. a shover source address referring to the intended web page; and
E. and further comprising the steps of:
i. before retrieving the replacement web page,
a. storing the original one of the client or the subscriber destination address in a storage location,
b. overwriting the original one of the client or the subscriber destination address in the one of the client or the subscriber data packet with a redirected destination address referring to the replacement web page,
ii. after receiving the return traffic from the web content shove server,
a. retrieving the original one of the client or the subscriber destination address from the storage location, and
b. overwriting the shover source address in the shover data packet with the original one of the client or the subscriber destination address.

19. The method of claim 18, in which the communications path is a channel linking one of a client or a subscriber network, of which the one of the client or the subscriber is a node, to a WAN, of which the web page content server is a node.

20. The method of claim 19, in which the web content shove server is a node accessible to the one of the client or the subscriber.

21. The method of claim 19, in which the web content shove server is a software-based process running on a web traffic monitor that performs the step of intercepting web traffic, which is a node connected to the communications path.

22. A computer readable medium having computer-executable instructions for redirecting web traffic by performing the steps comprising:
A. intercepting at least some of the web traffic on a communication path between one of a client or a subscriber and a web page content server and
B. determining whether the intercepted web traffic includes a request originating from the one of the client or the subscriber for an intended web page which may be retrieved from the web page content server and:
i. if the traffic does include the request for the intended web page, then determining whether a predetermined criterion is met, and
a. if the predetermined criterion is met,
1) requesting a replacement web page other than that which was intended by the one of the client or the subscriber from a web content shove server and
2) returning the replacement web page to the one of the client or the subscriber, or
b. if the predetermined criterion is not met, then transmitting the request for the intended web page on the communication path to the web page content server; or
ii. if the traffic does not include the request for the intended web page, transmitting the traffic to an appropriate location.

23. The computer-readable medium of claim 22, in which the predetermined criterion is a particular length of time that has elapsed since an immediately preceding request from the one of the client or the subscriber for any web page.

24. The computer-readable medium of claim 22, in which the predetermined criterion is that the request is directed to at least one of a particular set of IP destination addresses.

25. The computer-readable medium of claim 22, in which the predetermined criterion is that the request originates from at least one of a particular set of IP source addresses.

26. The computer-readable medium of claim 22, having further computer-executable instructions for performing the step of returning the intended web page to the one of the client or the subscriber after a predetermined viewing time period has elapsed after performing the step of returning the replacement web page to the one of the client or the subscriber.

27. The computer-readable medium of claim 22, in which the step of returning the replacement web page to the one of the client or the subscriber is performed by returning the replacement web page in a secondary window and further comprising the step of retuining the intended web page to the one of the client or the subscriber in a primary window.

28. A computer readable medium having computer-executable instructions for redirecting web traffic by performing the steps comprising:
A. intercepting at least some of the web traffic on a communication path between one of client or a subscriber and a web page content server and
B. determining whether the intercepted web traffic includes a request originating from the one of the client or the subscriber for an intended web page which may be retrieved from the web page content server and:
i. if the traffic does include the request for the intended web page, then determining whether a predetermined criterion is met, and
a. if the predetermined criterion is met,
1) requesting a replacement web page from a web content shove server and
2) returning the replacement web page to the one of the client or the subscriber; or
b. if the predetermined criterion is not met, then transmitting the request for the intended web page on the communication path to the web page content server; or
ii. if the traffic does not include the request for the intended web page, transmitting the traffic to an appropriate location, in which:
C. the step of requesting the intended web page includes transmission of one of a client or a subscriber data packet, comprising:
i. an original one of a client or a subscriber destination address referring to the intended web page and
ii. one of a client or a subscriber source address referring to the one of the client or the subscriber;
D. the step of returning the replacement web page is accomplished via return traffic originating from the web content shove server including a shover data packet, comprising:
i. a shover destination address referring to the one of the client or the subscriber and
ii. a shover source address referring to the intended web page; and
E. and further comprising the steps of:
i. before retrieving the replacement web page;
a. storing the original one of the client or the subscriber destination address in a storage location,
b. overwriting the original one of the client or the subscriber destination address in the one of the client or the subscriber data packet with a redirected destination address referring to the replacement web page,
ii after receiving the return traffic from the web content shove server, a. retrieving the original one of the client or the subscriber destination address from the storage location, and
b. overwriting the shover source address in the shover data packet with the original one of the client or the subscriber destination address.

29. The computer-readable medium of claim 28, in which the communications path is a channel linking one of a client or a subscriber network, of which the one of the client or the subscriber is a node, to a WAN, of which the web page content server is a node.

30. The computer-readable medium of claim 29, in which the web content shove server is a node accessible to the one of the client or the subscriber.

31. The computer-readable medium of claim 29, in which the web content shove server is a software-based process running on a web traffic monitor that performs the step of intercepting web traffic, which is a node connected to the communications path.

* * * * *